(12) United States Patent
Beckmann et al.

(10) Patent No.: US 10,801,759 B2
(45) Date of Patent: Oct. 13, 2020

(54) DOMESTIC REFRIGERATION APPLIANCE WITH A COOLANT CIRCUIT AND METHOD FOR OPERATING A DOMESTIC REFRIGERATION APPLIANCE WITH A COOLANT CIRCUIT

(71) Applicant: BSH HAUSGERAETE GMBH, Munich (DE)

(72) Inventors: Tommy Beckmann, Hilzingen (DE); Moritz Klein, Giengen (DE); Achim Paulduro, Albeck (DE); Christoph Spiegel, Kempten (DE)

(73) Assignee: BSH Hausgeraete GmbH, Munich (DE)

( * ) Notice: Subject to any disclaimer, the term of this patent is extended or adjusted under 35 U.S.C. 154(b) by 67 days.

(21) Appl. No.: 15/773,874

(22) PCT Filed: Oct. 12, 2016

(86) PCT No.: PCT/EP2016/074406
§ 371 (c)(1),
(2) Date: May 4, 2018

(87) PCT Pub. No.: WO2017/076588
PCT Pub. Date: May 11, 2017

(65) Prior Publication Data
US 2019/0072301 A1    Mar. 7, 2019

(30) Foreign Application Priority Data
Nov. 6, 2015    (DE) .................. 10 2015 221 881

(51) Int. Cl.
*F25B 49/02* (2006.01)
*F25B 31/02* (2006.01)
*F25D 29/00* (2006.01)

(52) U.S. Cl.
CPC ............ *F25B 31/023* (2013.01); *F25B 31/02* (2013.01); *F25B 49/025* (2013.01); *F25D 29/00* (2013.01);
(Continued)

(58) Field of Classification Search
CPC ................ F25B 31/023; F25B 2500/27; F25B 2600/021; F25B 2600/024; F25B 2600/0253
See application file for complete search history.

(56) References Cited

U.S. PATENT DOCUMENTS 4,026,122 A * 5/1977 Kuhn .................... F04B 49/243
                                                         62/196.3
4,416,359 A * 11/1983 Miller .................. F16D 13/757
                                                         192/111.16
(Continued)

FOREIGN PATENT DOCUMENTS

DE      102006013189 A1    11/2006
EP          2669519 A1    12/2013

OTHER PUBLICATIONS

WO 2004/083744 (English Translation) (Year: 2004).*

*Primary Examiner* — Jonathan Bradford
(74) *Attorney, Agent, or Firm* — Laurence A. Greenberg; Werner H. Stemer; Ralph E. Locher

(57) ABSTRACT

A domestic refrigeration appliance has a heat-insulated housing with a coolable inner container delimiting a coolable interior for storing foods. The interior is cooled with a coolant circuit that includes a compressor with a three-phase motor operated by an actuator via electrically powered motor windings. The actuator is actuated at least indirectly to operate the compressor in a switched-on state with a rotational speed of the three-phase motor at least approximately equal to a predetermined rotational speed. The actuator is caused to switch off the compressor such that
(Continued)

the rotational speed of the three-phase motor decreases to a predetermined minimum rotational speed, and thereafter to switch off the three-phase motor for at least a predetermined period of time by de-energizing the motor windings. The period of time is selected long enough to reduce the speed of the motor, beginning from the minimum rotational speed, to reach standstill.

10 Claims, 3 Drawing Sheets

(52) U.S. Cl.
CPC ..... *F25B 2500/27* (2013.01); *F25B 2600/021* (2013.01); *F25B 2600/024* (2013.01); *F25B 2600/0253* (2013.01); *Y02B 30/741* (2013.01); *Y02B 40/32* (2013.01)

(56) References Cited

U.S. PATENT DOCUMENTS

| | | | | |
|---|---|---|---|---|
| 5,524,448 | A | * | 6/1996 | Schwanebeck .......... H02H 7/08 361/22 |
| 5,857,349 | A | | 1/1999 | Hamaoka et al. |
| 2011/0030398 | A1 | * | 2/2011 | Marcinkiewicz ..... F25B 49/027 62/115 |
| 2012/0234030 | A1 | * | 9/2012 | Hagita ................... F04B 35/04 62/129 |

* cited by examiner

DOMESTIC REFRIGERATION APPLIANCE WITH A COOLANT CIRCUIT AND METHOD FOR OPERATING A DOMESTIC REFRIGERATION APPLIANCE WITH A COOLANT CIRCUIT

BACKGROUND OF THE INVENTION

Field of the Invention

The invention relates to a domestic refrigeration appliance with a coolant circuit and a method for operating a domestic refrigeration appliance with a coolant circuit.

Domestic refrigeration appliances comprise a coolable interior for storing foods and a coolant circuit for cooling the coolable interior. The coolant circuit comprises a compressor, a condenser arranged downstream of the compressor, a throttle device arranged downstream of the condenser and an evaporator, which is arranged between the throttle device and the compressor.

EP 2 669 519 A1 discloses a piston compressor and an electronic control device, which activates the piston compressor for its switch-off such that during the stop of the piston compressor, its electric motor generates a braking torque until the compressor comes completely to a stop if a predetermined speed is not reached.

SUMMARY OF THE INVENTION

The object of the invention is to specify a further possibility of stopping a compressor, which is part of a domestic refrigeration appliance. A further object of the invention is to specify a corresponding domestic refrigeration appliance.

The object of the invention is achieved by a method for operating a domestic refrigeration appliance, which delimits a heat-insulated housing with a coolable inner container, which delimits a coolable interior provided for storing foods, an actuator, and a coolant circuit which is provided for cooling the coolable interior, and has a compressor, wherein the compressor comprises a three-phase motor, which has motor windings to which electric power can be applied for operation of the three-phase motor by means of the actuator, having the following method steps for stopping the compressor:
  operating the switched-on compressor, by the three-phase motor being operated, activated by the actuator, at least approximately in accordance with a predetermined rotational speed,
  in order to switch off the switched-on compressor, reducing the rotational speed of the three-phase motor controlled by the actuator until the rotational speed reaches a predetermined minimum rotational speed, and then
  switching off the three-phase motor for at least one predetermined period of time, by the motor windings being de-energized, wherein the predetermined period of time is selected to be long enough for the rotational speed of the three-phase motor, beginning from the minimum rotational speed, to reach the rotational speed of 0 rpm.

The object is also achieved by a domestic refrigeration appliance, having a heat-insulated housing with a coolable inner container, which delimits a coolable interior provided for storing foods, an actuator and a coolant circuit which is provided for cooling the coolable interior and has a compressor which comprises a three-phase motor, which, for operation of the three-phase motor by means of the actuator, has motor windings which can be activated with electric power, wherein the domestic refrigeration appliance is set up,
  to activate the actuator at least indirectly such that when the compressor is switched on, the rotational speed of the three-phase motor, on account of activation by the actuator, is at least approximately equal to a predetermined rotational speed,
  to activate the actuator at least indirectly in order to switch off the switched-on compressor, so that the rotational speed of the three-phase motor, controlled by the actuator, decreases until the rotational speed reaches a predetermined minimal rotational speed, and thereafter
  to activate the actuator at least indirectly such that the three-phase motor is switched off for at least a predetermined period of time, by the motor windings being de-energized, wherein the predetermined period of time is selected to be long enough for the rotational speed of the three-phase motor, beginning from the minimum rotational speed, to reach the rotational speed 0 rpm.

The inventive domestic refrigeration appliance is accordingly configured to carry out the inventive method automatically.

The inventive domestic refrigeration appliance comprises the heat-insulated housing with the inner container, which delimits the coolable interior. The coolable interior is provided for storing foods and is cooled by means of the coolant circuit.

The coolable interior can preferably be closed by means of a door leaf. The door leaf is preferably mounted pivotably with respect to an axis, which preferably runs vertically. In the opened state, the coolable interior is accessible.

The coolant circuit is essentially known as such to the person skilled in the art and comprises the compressor and in particular a condenser arranged downstream of the compressor, a throttle device arranged downstream of the condenser and an evaporator, which is arranged between the throttle device and the compressor.

The three-phase motor is preferably a three-phase synchronous motor, in particular a permanently-excited three-phase synchronous motor, such as e.g. a brushless direct current motor.

The three-phase motor comprises in particular a stator with the motor windings and a rotor mounted rotatably with respect to the stator.

The compressor is preferably a piston compressor, which has in particular a compressor chamber with an inlet and with an outlet, a piston mounted movably within the compressor chamber and a crankshaft. The rotor is in particular coupled via the crankshaft to the piston, so that when the compressor is switched on the piston has the ability to reduce a volume enclosed by the compressor chamber and the piston in order to compress a coolant of the coolant circuit using the three-phase motor.

During operation of the compressor, i.e. in its switched-on state, the three-phase motor is operated in particular with a rotational speed determined or predetermined by the electronic control device or a temperature control.

When the compressor is switched on, so that the coolant circuit cools the coolable interior, then the three-phase motor is operated, activated by the actuator, such that the rotational speed of the three-phase motor, on account of activation by the actuator, is at least approximately equal to a predetermined rotational speed, i.e. the rotor of the three-phase motor rotates relative to the stator at this rotational speed.

The three-phase motor and the actuator form an electric drive. The domestic refrigeration appliance can preferably have a regulated electric drive which comprises the actuator and the three-phase motor and which in addition still comprises a control. In this case, when the compressor is switched on, the three-phase motor is preferably operated in a rotational speed-regulated manner activated by the actuator. For improved control behavior, the rotational speed-regulated electric drive preferably comprises a field-oriented control.

The actuator is preferably embodied as an inverter or converter. Converters are essentially known to the person skilled in the art and are configured to generate a three-phase electric voltage with a frequency assigned to the rotational speed of the three-phase motor from a direct voltage. In this case, the three-phase electric voltage is applied to the motor windings for activating the motor windings with electric power.

In order to reliably stop the switched-on compressor upon switch-off, provision is made in accordance with the invention for the actuator to activate at least indirectly such that the rotational speed of the three-phase motor decreases, controlled by the actuator, until the rotational speed reaches the predetermined minimum rotational speed.

To this end, provision can be made for a controller of the compressor, during its operation with in particular any rotational speed by the three-phase motor, to obtain a signal for stopping the compressor from the electronic control device.

Decreasing the rotational speed of the three-phase motor here can be carried out with a constant gradient, for instance 400 (revolutions per second)/(second) or also with a variable gradient. The minimum rotational speed amounts to 800 rpm for instance. The minimum rotational speed may be equal to the minimum operating speed of the three-phase motor. It may however also be higher or lower than the minimum operating speed of the three-phase motor.

If the domestic refrigeration appliance has the regulated electric drive, then the rotational speed can be decreased in a speed-regulated manner by down-regulating the rotational speed.

Decreasing the rotational speed can also be carried out by means of a brake method. Provision can be made in particular for the frequency of the three-phase electrical voltage to be reduced, in particular in a controlled manner, by the electronic control device, so that the rotational speed of the three-phase motor decreases until the predetermined minimum rotational speed.

The three-phase motor is therefore not actively braked until shutdown, but only until it has reached the minimum rotational speed.

In accordance with the invention, the actuator is then activated at least indirectly such that the three-phase motor is switched off for at least one predetermined period of time. This is achieved in particular by switching off the activation, i.e. the actuator for the predetermined period of time (switch-off time) of e.g. 2 seconds. The activation is switched off when the minimum rotational speed is reached and can optionally be synchronized relative to the stator when a specific position of the rotor relative to the stator is reached. As a result, the compressor can be stopped more quietly. By switching off the activation, the motor windings are de-energized, as a result of which the three-phase motor is no longer actively braked or its rotational speed is no longer actively decreased. The predetermined period of time is selected to be long enough for the rotational speed of the three-phase motor, beginning from the minimum rotational speed, to reach the rotational speed or the actual rotational speed 0 rpm. As a result, the three-phase motor and thus the compressor, beginning from the minimum rotational speed, preferably reach a full shutdown, i.e. the predetermined period of time or the switch-off time is measured such that the compressor, on account of its internal friction during this switch-off time, comes to a shutdown ideally below all pressure ratios, i.e. the actual rotational speed of the three-phase motor equates to zero. In practice, it may occur, however, that following shutdown, i.e. once it has reached the rotational speed of zero, the compressor and thus the three-phase motor rotate backward a little. Such a backward rotation may then possibly be hindered or at least decreased by an active braking, e.g. by a corresponding energization or short-circuiting of the motor windings, preferably activated by the actuator, so that the three-phase motor and thus the compressor subsequently reach a complete shutdown.

Provision can then still be made for the three-phase motor to be moved in a controlled manner by the actuator such that the piston assumes a predetermined position relative to the compressor chamber once the three-phase motor and thus the compressor reach a complete shutdown or the three-phase motor has reached the rotational speed of 0 rpm.

BRIEF DESCRIPTION OF THE SEVERAL VIEWS OF THE DRAWING

One exemplary embodiment of the invention is shown by way of example in the appended, schematic drawings, in which.

DESCRIPTION OF THE INVENTION

Figure 1:
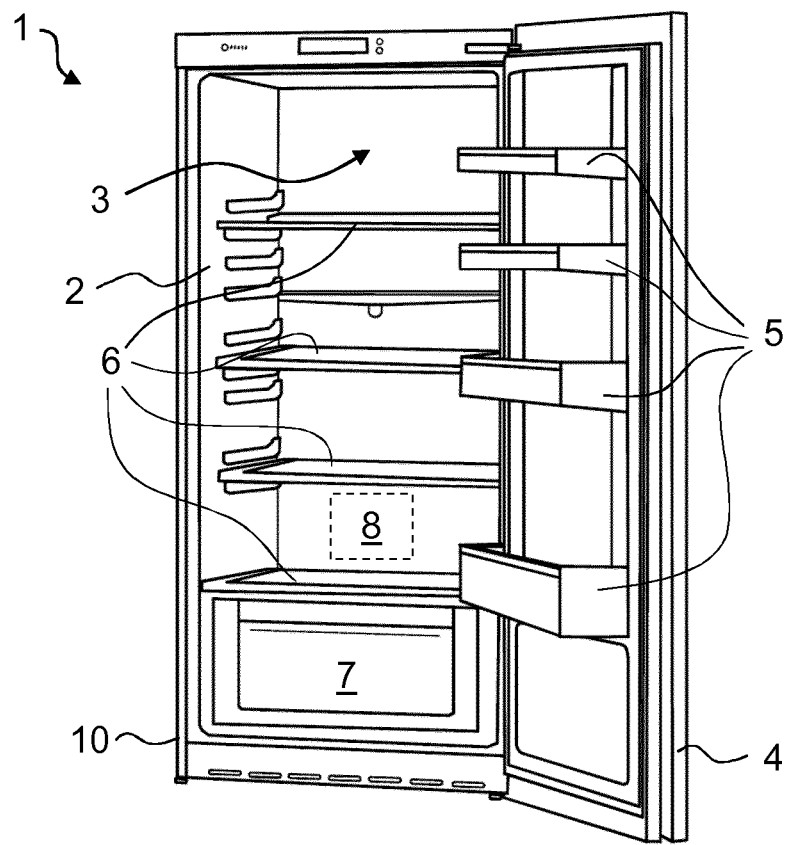
FIG. 1 shows a domestic refrigeration appliance in a perspective view.

FIG. 1 shows a perspective view of a domestic refrigeration appliance 1, which comprises a heat-insulated housing 10 with an inner container 2, which delimits a coolable interior 3. The coolable interior 3 is provided for storing food (not shown in detail).

In the case of the present exemplary embodiment, the domestic refrigeration appliance 1 has a pivotable door leaf 4 for closing the coolable interior 3. The door leaf 4 is supported, in particular, pivotably relative to a vertically extending axis. When the door leaf 4 is opened as shown in FIG. 1, the coolable interior 3 is accessible.

Arranged on the side of the door leaf 4 facing in the direction of the coolable interior 3 in the case of the present exemplary embodiment are a plurality of door trays 5 for storing food. Arranged in the coolable interior 3 are, in particular, a plurality of shelves 6 for storing food and arranged, in particular, in the lower region of the coolable interior 3 is a drawer 7 in which, also, food can likewise be stored.

Figure 2:
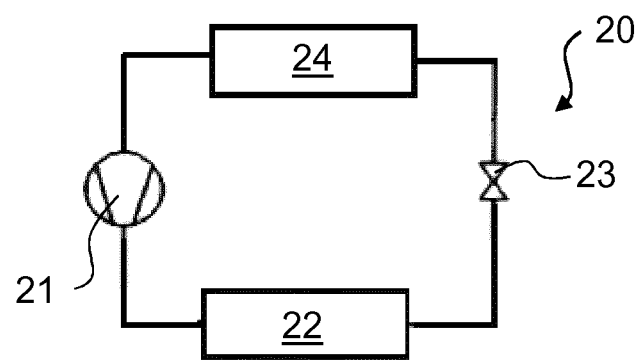
FIG. 2 shows a coolant circuit of the domestic refrigeration appliance having a compressor.

The domestic refrigerator 1 comprises a coolant circuit 20, shown in FIG. 2, for cooling the coolable interior 3. In the case of the present exemplary embodiment, the coolant circuit 20 comprises a coolant essentially known to the person skilled in the art, but not shown in more detail, a compressor 21, a condenser 22 arranged downstream of the compressor 21, a throttle device 23 arranged downstream of the condenser 22, which is embodied in particular as a throttle or capillary tube, and an evaporator 24 which is arranged between the throttle device 23 and the compressor 21. The compressor 21 is preferably arranged within a machine compartment of the domestic refrigeration appliance 1, which is disposed, in particular, behind the drawer 7.

Figure 3:
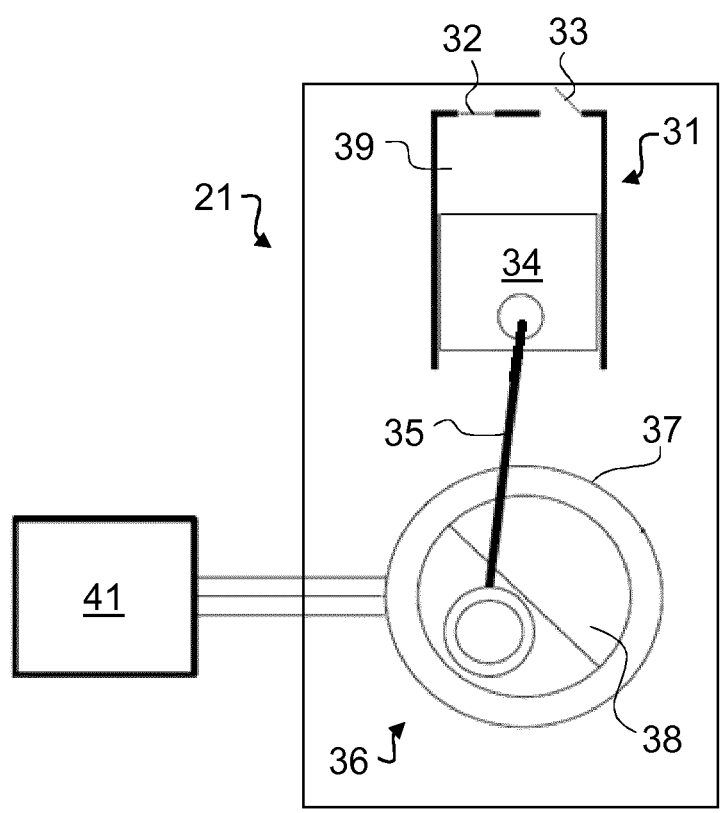
FIG. 3 shows the compressor, which comprises a three-phase synchronous motor.

The compressor 21 is preferably embodied as a piston compressor and shown in more detail in FIG. 3.

The compressor 21 comprises a compressor chamber 31 with an inlet 32 and with an outlet 33 for the coolant, and a piston 34 supported movably within the compressor chamber 31. The inlet 32 and the outlet 33 are each provided with corresponding valves, such as is essentially known to the person skilled in the art.

The compressor 21 comprises a crankshaft 35 and a three-phase motor embodied preferably as a three-phase synchronous motor 36.

The three-phase synchronous motor 36 is in particular a permanent magnet-excited three-phase synchronous motor, preferably a brushless direct current motor, and comprises a stator 37 and a rotor 38 which is supported pivotably relative to the stator 37. One of the ends of the crankshaft 35 is coupled to the piston 34 and the other end of the crankshaft 35 is coupled to the rotor 38 of the three-phase synchronous motor 36, so that during normal operation of the domestic refrigeration appliance 1 or when the compressor 21 is switched on, the piston 34 is able to decrease a volume 39, enclosed by the compressor chamber 31 and the piston 34 for compressing the coolant, using the three-phase synchronous motor 36.

In the case of the present exemplary embodiment, the domestic refrigeration appliance 1 comprises an electronic control device 8, which is configured to activate the coolant circuit 20, in particular the compressor 21 of the coolant circuit 20, such that the coolable interior 3 has at least approximately a predetermined or predeterminable target temperature. The electronic control device 8 is preferably configured such that it regulates the temperature of the coolable interior 3. In order, if required, to obtain the actual temperature of the coolable interior 3, the domestic refrigeration appliance 1 can have at least one temperature sensor (not shown in detail) which is connected to the electronic control device 8.

Figure 4:
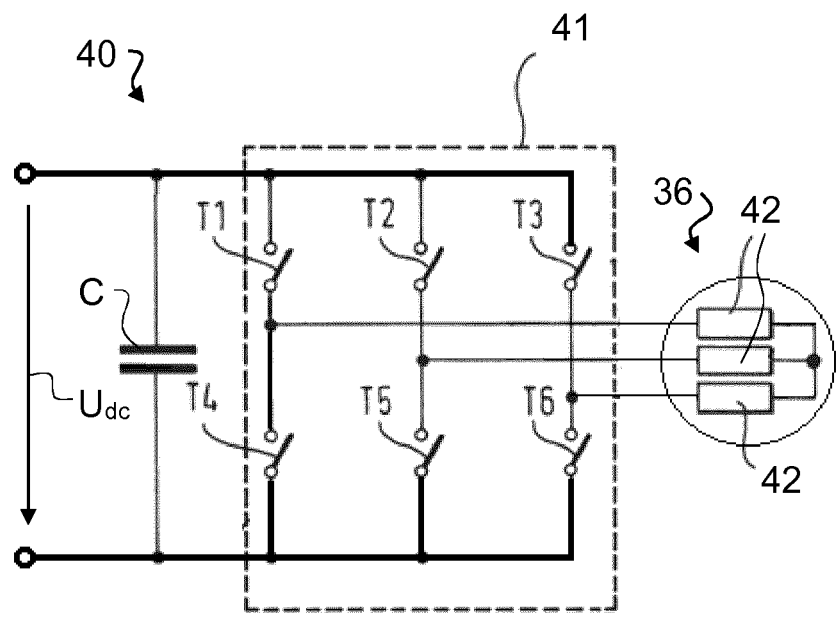
FIG. 4 shows the three-phase synchronous motor and an actuator activating the three-phase synchronous motor.

In order to activate or regulate the coolant circuit 20, in the case of the present exemplary embodiment, the domestic refrigeration appliance 1 comprises an electrical drive 40, shown in FIG. 4, which has the three-phase synchronous motor 36 of the compressor 21. The electrical drive 40 comprises, aside from the three-phase synchronous motor 36, an actuator activating the three-phase synchronous motor 36, preferably in the form of an inverter or converter 41.

The electrical drive 40 is preferably a regulated electrical drive, which is preferably based on the field-oriented control essentially known to the person skilled in the art and comprises a control (not shown). A field-oriented control forms a cascade structure with internal current control loops, which is overlaid by an external rotational speed control loop.

The actual rotational speed $n_{actual}$ of the three-phase synchronous motor 36 is preferably determined without a sensor.

In the case of the present exemplary embodiment, if required the three-phase synchronous motor 36 is driven according to a target rotational speed $n_{target}$ predetermined by the electronic control device 8. In this state, the compressor 21 is switched on. The target rotational speed $n_{target}$ is calculated or predetermined in particular by the electronic control device 8, on account of an intentional cooling of the coolable interior 3, for instance on account of the current temperature and the target temperature of the coolable interior 3.

During operation of the electric drive 40, the actuator or the converter 41 in a generally known manner generates a three-phase electrical voltage from a direct voltage $U_{dc}$, the fundamental oscillation of which has an amplitude and a basic frequency f, which is directly dependent on the target rotational speed $n_{target}$ and the actual rotation speed $n_{actual}$ of the three-phase synchronous motor 36. In particular, the converter 41 is able, in a generally known manner, to generate the three-phase electrical voltage for the three-phase synchronous motor 36 from the direct voltage $U_{dc}$ such that during operation of the compressor 21 by motor windings 41 of the three-phase synchronous motor 36 or its stator 37, electrical currents are able to flow in order to operate the three-phase synchronous motor 36 at the desired rotational speed, i.e. the rotor 38 rotates relative to the stator 37 with the actual rotational speed $n_{actual}$.

The converter 41 comprises in particular, as is essentially known to the person skilled in the art, a number of activatable semiconductor switches T1 to T6, which comprise e.g. transistors, for instance IGBTs, in each case. In particular, the converter 41, as is generally known, comprises an upper half bridge with a first group of semiconductor switches T1 to T3, and a lower half bridge with a second group of semiconductor switches T4 to T6.

Figure 5:
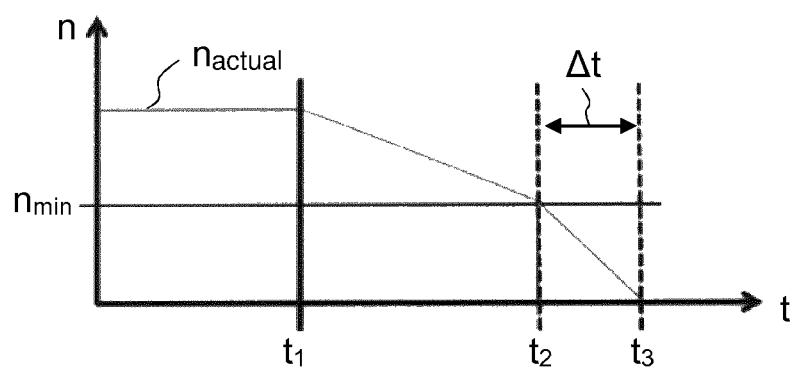
FIG. 5 shows a course of a rotational speed of the three-phase synchronous motor.

In the case of the present exemplary embodiment, the domestic refrigeration appliance 1 is configured to switch off the ongoing, i.e. switched-on compressor 21, on account of the subsequently described method. FIG. 5 shows the actual rotational speed $n_{actual}$ of the three-phase synchronous motor 36 as a function of time t during this switch-off.

The compressor 21 is firstly switched on, so that in the case of the present exemplary embodiment, the three-phase synchronous motor 36 is operated in a speed-regulated manner and the actual speed $n_{actual}$ is at least approximately equal to the predetermined target rotational speed $n_{target}$.

At a first point in time $t_1$, the compressor 21 is to be switched off. Thereupon the electronic control device 8 in particular controls the converter 41 at least indirectly such that the actual speed $n_{actual}$ of the three-phase synchronous motor 36 decreases until the actual speed $n_{actual}$ has reached a predetermined minimum rotational speed $n_{min}$. Decreasing the rotational speed of the three-phase synchronous motor 36 can be carried out with a constant gradient, for instance 400 (revolutions per second)/(second) or also with a variable gradient. The minimum rotational speed $n_{min}$ amounts to 800 rpm for instance. The minimum rotational speed $n_{min}$ may equate to the minimum operating speed of the three-phase synchronous motor 36. It may however also be higher or lower than the minimum operating speed of the three-phase synchronous motor 36.

Decreasing the rotational speed of the three-phase synchronous motor 36 does not necessarily have to be carried out in a speed-regulated manner. It is also possible to activate the semiconductor switches T1-T6 directly, e.g. by means of the electronic control device 8, such that the frequency of the three-phase electrical voltage decreases, as a result of which the rotational speed of the three-phase motor 36 likewise decreases. The frequency of the three-phase electrical voltage is at least an approximate measure of the actual rotational speed $n_{actual}$. The converter 41 or its semiconductor switches T1-T6 are activated in particular such that they effect a significant braking torque on the three-phase synchronous motor.

In the case of the present exemplary embodiment, the rotational speed of the three-phase synchronous motor 36 reaches the minimum rotational speed $n_{min}$ at a second point in time t2. Hereupon the electronic control device 8 in particular controls the converter 41 at least indirectly such that the three-phase synchronous motor 36 is switched off for at least one predetermined period of time Δt. This is achieved by the motor windings 42 being de-energized, by, in the case of the present exemplary embodiment, at least the semiconductor switches T4-T6 of the lower half bridge of the converter 41 being opened.

The switch-off of the three-phase synchronous motor 36 can optionally be synchronized with the reaching of a specific position of the rotor 38 relative to the stator 37.

The predetermined period of time Δt is selected to be sufficiently long for the rotational speed, i.e. the actual rotational speed $n_{actual}$ of the three-phase synchronous motor 36, beginning from the minimum rotational speed $n_{min}$, to reach the rotational speed of 0 rpm at a third point in time t3. The predetermined period of time Δt can be determined empirically.

In practice, it may occur, however, that the compressor 21 and thus the three-phase synchronous motor 36, after the shutdown, i.e. once it has reached the rotational speed equating to 0 rpm, rotates backward a little. Such a backward movement may then if necessary be prevented or at least decreased by an active braking e.g. by a corresponding energizing or by a short-circuiting of the motor windings 42, preferably activated by the converter 41, so that the three-phase synchronous motor 36 and thus the compressor 21 come to a full shutdown.

In the case of the present exemplary embodiment, provision can still be made for the domestic refrigeration appliance 1 to be configured, once the three-phase synchronous motor 36 and thus the compressor 21 have come to a complete shutdown, to move the three-phase synchronous motor 36 in a controlled manner by means of the converter 41 such that the piston 34 assumes a predetermined position relative to the compressor chamber 31.

LIST OF REFERENCE CHARACTERS

1 Domestic refrigeration appliance
2 Inner container
3 Coolable interior
4 Door leaf
5 Door tray
6 Shelf
7 Drawer
8 Electronic control device
10 Housing
20 Coolant circuit
21 Compressor
22 Condenser
23 Throttle device
24 Evaporator
31 Compressor chamber
32 Inlet
33 Outlet
34 Piston
35 Crankshaft
36 Three-phase synchronous motor
37 Stator
38 Rotor
39 Volume
40 Electrical drive
41 Converter
42 Motor windings
C Capacitor
$n_{actual}$ Actual rotational speed
t Time
$t_1$-$t_3$ Point in time
T1-T6 Semiconductor switches
$U_{dc}$ Direct voltage
Δt Period of time

The invention claimed is:

1. A method of operating a domestic refrigeration appliance, the appliance having a heat-insulated housing with a coolable inner container, which delimits a coolable interior for storing foods, an actuator, and a coolant circuit with a compressor for cooling the coolable interior, the compressor having a three-phase motor with motor windings to be operated by the actuator by electrically powering the motor windings, the method comprising:
   operating the compressor in a switched-on state by operating the three-phase motor, activated by the actuator, substantially at a predetermined rotational speed;
   switching off the compressor from the switched-on state by:
   reducing the rotational speed of the three-phase motor, under control of the actuator, until the rotational speed reaches a predetermined minimum rotational speed; and
   subsequently switching off the three-phase motor by de-energizing the motor windings for a predetermined period of time;
   thereby selecting the predetermined period of time to be long enough for the rotational speed of the three-phase motor, beginning from the minimum rotational speed, to reach a rotational speed of zero rpm; and
   after the expiration of the predetermined period of time, applying an active braking to the three-phase motor with the actuator to ensure that the three-phase motor and the compressor reach a complete shutdown.

2. The method according to claim 1, wherein:
   the three-phase motor is a three-phase synchronous motor; and/or
   the compressor is a piston compressor;
   the domestic refrigeration appliance has a closed-loop controlled electric drive comprising the actuator and the three-phase motor, and having speed-regulated operation of the compressor in the switched-on state, so that the three-phase motor is operated, activated by the actuator, at substantially the predetermined rotational speed; and/or
   the actuator is a converter that generates a three-phase electric voltage with a frequency assigned to the rotational speed of the three-phase motor from a direct voltage and the three-phase electric voltage is applied to the motor windings for activating the motor windings with the electric power.

3. The method according to claim 2, wherein the reducing step comprises decreasing a frequency of a three-phase electrical voltage to decrease the rotational speed of the three-phase motor to the predetermined minimal rotational speed.

4. The method according to claim 2, wherein the reducing step comprises speed-regulated decreasing of the rotational speed of the three-phase motor controlled by the actuator until the rotational speed reaches the predetermined minimum rotational speed.

5. A method of operating a domestic refrigeration appliance, the appliance having a heat-insulated housing with a coolable inner container, which delimits a coolable interior for storing foods, an actuator, and a coolant circuit with a compressor for cooling the coolable interior, the compressor having a three-phase motor with motor windings to be operated by the actuator by electrically powering the motor windings, the method comprising:

operating the compressor in a switched-on state by operating the three-phase motor, activated by the actuator, substantially at a predetermined rotational speed, the compressor having a compressor chamber with an inlet and with an outlet, a piston movably supported within the compressor chamber and a crankshaft, and the three-phase motor having a stator with the motor windings and a rotor rotatably supported with respect to the stator and coupled via the crankshaft with the piston;

in the switched-on state of the compressor, reducing a volume with the piston, for compressing a coolant of the coolant circuit enclosed by the compressor chamber;

switching off the compressor from the switched-on state by:

reducing the rotational speed of the three-phase motor, under control of the actuator, until the rotational speed reaches a predetermined minimum rotational speed; and subsequently switching off the three-phase motor by de-energizing the motor windings for a predetermined period of time;

thereby selecting the predetermined period of time to be long enough for the rotational speed of the three-phase motor, beginning from the minimum rotational speed, to reach a rotational speed of zero rpm;

and, additionally, once the three-phase motor has reached the rotational speed of zero rpm, moving the three-phase motor, under control of the actuator, until the piston assumes a predetermined position relative to the compressor chamber.

6. A domestic refrigeration appliance, comprising:

a heat-insulated housing with a coolable inner container that delimits a coolable interior for storing foods;

an actuator and a coolant circuit for cooling the interior, said coolant circuit including a compressor with a three-phase motor having motor windings to be activated with electric power under control of said actuator;

an electronic control device for controlling an operation of said cooling circuit, said electronic control device being configured:

to activate said actuator such that, when said compressor is switched on, a rotational speed of said three-phase motor, on account of activation by said actuator is substantially equal to a predetermined rotational speed;

to activate said actuator at least indirectly in order to switch off said compressor and to decrease the rotational speed of said three-phase motor under control by said actuator until the rotational speed reaches a predetermined minimum rotational speed;

to subsequently activate said actuator to switch off said three-phase motor for at least a predetermined period of time, by de-energizing said motor windings, and to thereby select the predetermined period of time to be long enough for the rotational speed of said three-phase motor, beginning from the minimal rotational speed, to reach a rotational speed of zero rpm; and to subsequently, after the expiration of the predetermined period of time, apply an active braking to ensure that the three-phase motor and the compressor reach a complete shutdown under control of the actuator.

7. The domestic refrigeration appliance according to claim 6, wherein:

said three-phase motor is a three-phase synchronous motor;

said compressor is a piston compressor; and/or a closed-loop controlled electric drive comprising said actuator and said three-phase motor, and configured to operate said compressor in a switched-on state in a speed-regulated manner by way of said electric drive, so that the rotational speed of said three-phase motor is substantially equal to the predetermined rotational speed; and/or said actuator is a converter that generates a three-phase electric voltage with a frequency assigned to the rotational speed of said three-phase motor from a direct voltage, said voltage being applied to said motor windings for activating said motor windings with the electric power.

8. The domestic refrigeration appliance according to claim 7, configured to decrease the frequency of the three-phase electrical voltage, so that the rotational speed of said three-phase motor decreases to the predetermined minimal rotational speed.

9. The domestic refrigeration appliance according to claim 7, configured to decrease the rotational speed of said three-phase motor in the speed-regulated manner controlled by said actuator until the rotational speed reaches a predetermined minimum rotational speed.

10. The domestic refrigeration appliance according to claim 6, wherein:

said compressor comprises a compressor chamber with an inlet and an outlet, a piston movably supported within said compressor chamber and a crankshaft;

said three-phase motor comprises a stator with said motor windings and a rotor rotatably supported with respect to said stator and coupled via said crankshaft with said piston;

during an operation of said compressor, said piston decreasing a volume enclosed by said compressor chamber and said piston, for compressing a coolant of said coolant circuit, being driven by said three-phase motor; and after said three-phase motor has reached the rotational speed of zero rpm, said three-phase motor is moved in a controlled manner by said actuator to cause said piston to assume a predetermined position relative to said compressor chamber.

* * * * *